United States Patent [19]

Kamata

[11] Patent Number: 5,740,200
[45] Date of Patent: Apr. 14, 1998

[54] APPARATUS FOR MEASURING TRANSMISSION TIME UTILIZED FOR DATA COLLECTION SYSTEM

[75] Inventor: Shigeo Kamata, Tokyo, Japan

[73] Assignee: Fujitsu Limited, Kanagawa, Japan

[21] Appl. No.: 619,967

[22] Filed: Mar. 20, 1996

[30] Foreign Application Priority Data

Mar. 20, 1995 [JP] Japan ................... 7-060941

[51] Int. Cl.$^6$ .............................. H04B 3/46; H04B 17/00
[52] U.S. Cl. ................... 375/224; 370/517; 370/519
[58] Field of Search ............................ 375/224; 370/519, 370/517

[56] References Cited

U.S. PATENT DOCUMENTS

| | | | |
|---|---|---|---|
| 5,105,439 | 4/1992 | Bennett et al. | 375/10 |
| 5,128,925 | 7/1992 | Dornstetter et al. | 370/17 |
| 5,251,210 | 10/1993 | Mann et al. | 370/84 |
| 5,317,571 | 5/1994 | Marcel et al. | 370/103 |
| 5,351,239 | 9/1994 | Black et al. | 370/84 |
| 5,359,602 | 10/1994 | Diaz et al. | 370/85.8 |
| 5,363,375 | 11/1994 | Chuang et al. | 370/95.3 |
| 5,475,690 | 12/1995 | Burns et al. | 370/105.3 |
| 5,521,907 | 5/1996 | Ennis Jr. et al | 370/17 |

*Primary Examiner*—Stephen Chin
*Assistant Examiner*—Mohammad Ghayour
*Attorney, Agent, or Firm*—Helfgott & Karas, P.C.

[57] ABSTRACT

An apparatus for measuring transmission time is utilized for a data collection system including an observation station situated in a given wide-ranging region, and a collection station for collecting data from the observation station over a transmission line, and is designed for measuring the transmission time necessary for a signal to propagate through a transmission path. The apparatus is configured to have a signal detecting unit for taking out, from a signal indicating unit which indicates the states of various signals to be transmitted through a transmission path of a transmission line using light emitting devices or the like, and for detecting a first signal sent from a collection station in order to start data collection and a second signal returned from an observation station in order to notify that the first signal has been received, in a state in which the data collection system is kept running and the electrically uncoupled state relative to the transmission path is retained; and a transmission time calculating unit for calculating the transmission time of a signal propagating through the transmission path on the basis of a difference between the time instant at which the first and second signals are detected.

14 Claims, 10 Drawing Sheets

Fig.5
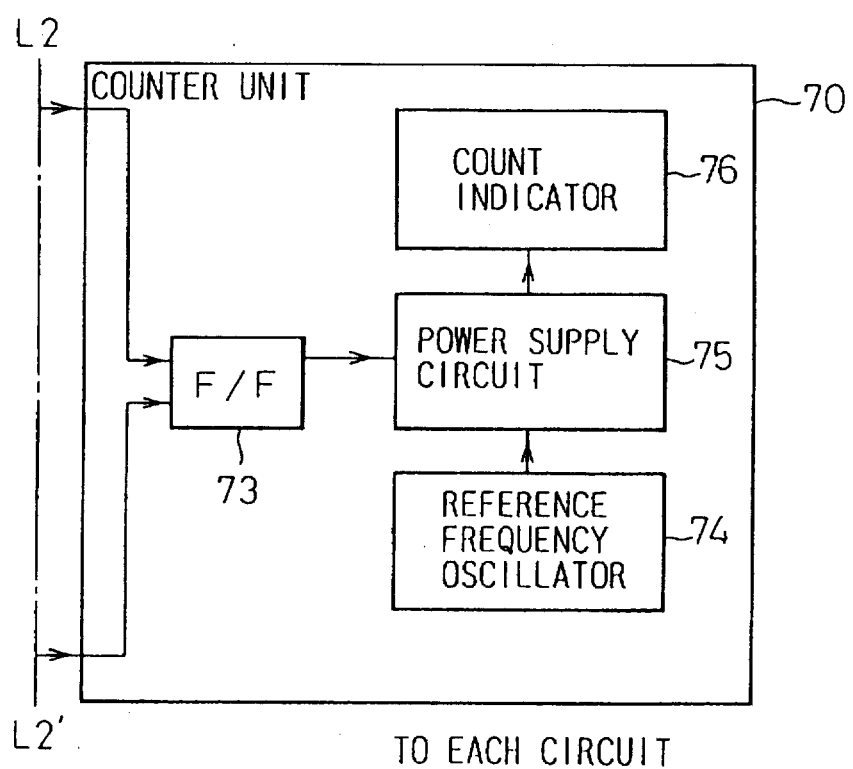
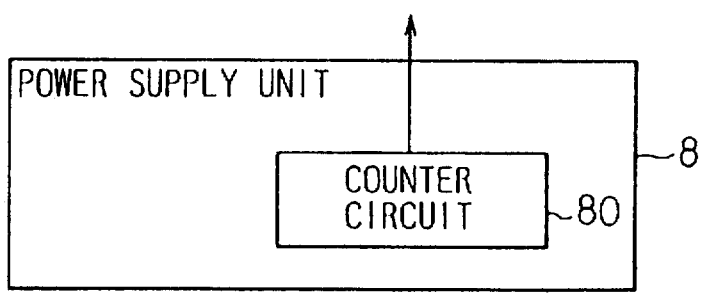

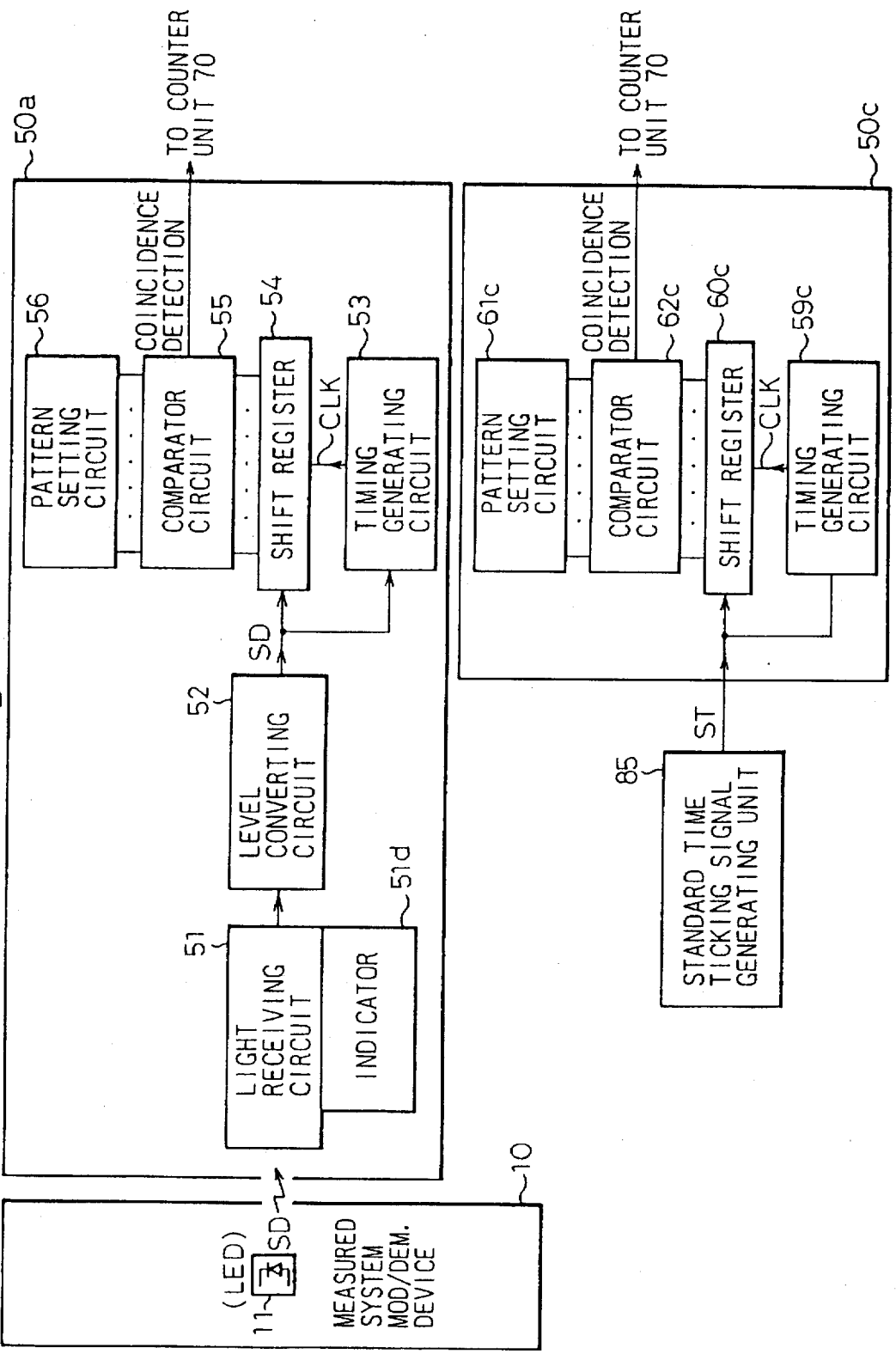

APPARATUS FOR MEASURING TRANSMISSION TIME UTILIZED FOR DATA COLLECTION SYSTEM

BACKGROUND OF THE INVENTION

1. Field of the Invention

The present invention relates to an apparatus for measuring transmission time which is utilized for a data collection system including an observation station situated in a wide-ranging region and a collection station for collecting data from the observation station over a transmission line, and which is designed to measure the transmission time necessary for any signal to propagate through a transmission path within the transmission line.

As mentioned above, in a data collection system designed to collect desired data, it may become necessary to measure the transmission time of a signal propagating through a transmission path within a transmission line linking a single observation station or a plurality of observation stations, for example, the delay time of a signal occurring during data transmission.

The present invention relates to a special data collection system in which it is difficult for ordinary general-purpose measuring equipment to measure the transmission time of a signal propagating a transmission path, and pertains to a technique for measuring the transmission time of a signal readily and quickly without interrupting a continuity the system operation.

2. Description of the Related Art

An earthquake observation system for converting an analogue quantity into a digital quantity and transmitting the digital quantity in real time can be taken, for instance, as a special data collection system adopting a transmission mode independent of a normal transmission protocol or a transmission mode independent of a standardized protocol.

In this kind of earthquake observation system, an epicenter of an earthquake is determined by calculating distances from the epicenter to a plurality of observation stations on the basis of time lag among earthquake waves arriving at a collection station from the observation stations. For minimizing the damage derived from an earthquake by grasping earthquake information accurately and quickly, very high precision is required for determining an epicenter of an earthquake. Speaking of time synchronism of earthquake waves coming from the plurality of observation stations, typically, it is necessary to ensure a synchronization error of 1 millisecond ($10^{-3}$sec) or smaller, relative to the national standard time subordinate to and synchronous with the international standard time.

In general, each observation station and a collection station are linked by a transmission line. A transmission path within the transmission line is not formed merely by a line. Various kinds of modulating/demodulating devices and transmission repeaters are inserted between the observation station and collection station. For the aforesaid determination of an epicenter of an earthquake, the delay time occurring in a transmission path due to the modulating/demodulating devices, transmission repeaters, and the like must be taken into consideration. To be more specific, the sum of delays attributable to the respective modulating/demodulating devices, transmission repeaters, and the like is equivalent to the delay time accompanying data transmission through a transmission path.

For better understanding of the problems of the prior art, data transmission in a conventional data collection system will be described with reference to FIGS. 1 and 2.

In the above data collection system, the time instant at which data-sampling is carried out at each observation station or each collected station is synchronized with the standard time by compensating for a delay occurring in a transmission path. In the above system, it becomes important in determining an epicenter of an earthquake with high precision to measure the delay time occurring in a transmission path.

The typical configuration of a data collection system is shown in a block diagram of FIG. 1. In FIG. 1, a plurality of observation stations including a first observation station 200-1 through the n-th observation station 200-n which are situated in a wide-ranging region, and a single collection station 100 for collecting various kinds of data from the observation stations are linked by a plurality of associated transmission lines (first transmission line to n-th transmission line) 300-1 to 300-n.

In FIG. 1, modulating/demodulating devices (also referred to as modems) 250-1 to 250-n, for modulating signals that contain data and are acquired at the observation stations, or demodulating signals that contain various kinds of commands and are sent from the collection station 100, are interposed between the plurality of observation stations 200-1 to 200-n and the plurality of transmission lines 300-1 to 300-n. Modulating/demodulating devices (modems) 150-1 to 150-n, for modulating signals to be transmitted from the collection station 100 or demodulating signals sent from the observation stations, are interposed between the collection station 100 and the plurality of transmission lines 300-1 to 300-n.

A dedicated line laid down by a maker concerned with a type I communication enterprise, a private line managed by a system operator, or the like is used as this kind of transmission line. The length of the dedicated line, private line, or the like ranges from several kilometers (km) to several hundreds of kilometers. Typically, when the length of a transmission line ranges from 200 to 300 kilometers, a delay of as long as approximately 0.2 sec. (200 msec.) occurs due to the time required for going and returning over the transmission line. The plurality of transmission lines 300-1 to 300-n cause mutually different unique delays because of the different lengths.

The transmission line is not formed merely by a line. A plurality of devices including modulating/demodulating devices and various kinds of transmission repeaters are inserted in each transmission line. The sum of delays attributable to the modulating/demodulating devices, transmission repeaters, and the like is regarded as the delay time occurring in a transmission path within a transmission line.

In recent years, especially, the upgrading of transmission modes has facilitated the trend toward intelligent modulating/demodulating systems or digital transmission systems (that is, buffering based on the use of numerous buffers has been adopted widely). The delay time occurring in a transmission path within a transmission line therefore tends to increase continually. It has become difficult to estimate the delay time merely by assessing the correlation with the lengths of transmission lines.

FIG. 2 is a timing chart for explaining a data transmission protocol in a conventional data collection system. A data transmission mode in the example of the aforesaid system shown in FIG. 1 will be described in conjunction with FIG. 2.

As shown in FIG. 2, a signal sent from the collection station 100 (FIG. 1) to the observation stations and data signals sent from the observation stations to the collection station 100 are transmitted by serial transmission (serial mode), and received via the associated modulating/demodulating devices.

To be more specific, as shown in a portion (1) of FIG. 2, the collection station 100 sends a command (signal C) instructing the start of data sampling (collection) to each observation station at intervals of 1 sec. using a 1 sec. signal synchronous with the standard time. The signal C is formed with a fixed bit string and used as a synchronizing (hereinafter sync) signal every second.

As shown in a portion (2) of FIG. 2, the sync signal (signal C) arrives at an observation station in time T1 via a modulating/demodulating device connected to the collection station, transmission line, and a modulating/demodulating device connected to the observation station.

In the observation station, as shown in a portion (3) of FIG. 2, as soon as the signal C representing a sampling start command is detected, data sampling (collection) is started. As shown in a portion (4) of FIG. 2, a certain processing time T2 later, data is returned with a data return notice (signal A), which serves as an answer to the collection station 100.

The signal A is, similarly to the signal C produced at the collection station 100, formed with a fixed bit string.

The returned signal A and data succeeding the signal A arrive, as shown in a portion (5) of FIG. 2, at the collection station 100 after time T3 via the modulating/demodulating device connected to the observation station, transmission line, and a modulating/demodulating device connected to the collection station 100.

In the collection station 100, as soon as the signal A representing a return notice is detected, data processing is executed.

When a special data format and data transmission mode shown in FIG. 2 are adopted, the delay time occurring in transmission paths within the transmission lines 300-1 to 300-n can be calculated as mentioned below.

First, a signal synchronous with the standard time; that is, a signal representing the absolute time is sent from the collection station 100 in the form of the signal C representing the start of data sampling.

Second, an echo of the thus sent signal C is awaited until it is returned from an observation station in the form of the signal A.

Third, the result of measuring time intervals T1, T2, and T3 (measurement object times) respectively and adding them up is divided by 2 on the assumption that the transmission time required for going a transmission path is the same as that required for coming back. In other words, the transmission time is the same in both directions. This gives the one-way delay time occurring in the transmission path.

If a command is issued earlier by the estimated delay of the one-way delay time from the collection station 100, the delay time is compensated for during propagation of the command through the transmission path. In the observation station, therefore, the command sent from the collection station 100 can be received at the time instant consistent with the standard time.

In the prior art, however, a general data collection system shown in FIG. 1 has not had a means for readily measuring the time intervals T1, T2, and T3 relevant to the delay time occurring in each of transmission lines in a whole system.

For measuring the time intervals T1, T2, and T3, a number of measuring instruments and the system must temporarily stop operating. The measurement of the time intervals T1, T2, and T3 causes several problems. Above all, as the number of observation stations or transmission lines increases, the number of temporary stoppages of the system for time measurement tends to increase. It is therefore becoming more and more difficult to quickly accomplish measurement of the delay time without a degradation in the system operating efficiency.

However, as mentioned above, it has come to take place occasionally that the total sum of delays occurring in a transmission system exceeds the limit of an existing system due to the trend toward a digital transmission system and complex network. It has therefore become a must to perform measurement readily and periodically on a whole system.

SUMMARY OF THE INVENTION

The present invention attempts to solve the foregoing problems. An object of the present invention is to provide an apparatus, for measuring transmission time that is utilized for a data collection system in which it is difficult for an ordinary general-purpose measuring equipment to measure the transmission time of a signal propagating a transmission path due to the trend toward a digital transmission system to be situated in a transmission path within a transmission line, and that can measure the transmission time of a signal readily and quickly without interrupting a continuity of the system operation.

In order to accomplish the above object, an apparatus for measuring transmission time, utilized for a data collection system in accordance with the present invention, is used for a data collection system including an observation station situated in a given region, a collection station for collecting data sent from the observation station over a transmission line, and a signal indicating unit for indicating the states of arbitrary signals to be transmitted through a transmission path within the transmission line, and the above apparatus is designed for measuring the transmission time necessary for the signal to propagate through the transmission path. The apparatus comprises a signal detecting means for taking out, from the signal indicating unit, and detecting a first signal to be sent from the collection station to the observation station in order to start data collection and a second signal to be returned from the observation station to the collection station in order to notify that the first signal has been received in a state in which the data collection system is kept operating and the electrically uncoupled state relative to the transmission path is retained; and a transmission time calculating means for calculating the transmission time of the signal, in the transmission path on the basis of a difference between the time instant at which the first and second signals are detected.

Preferably, in the apparatus for measuring transmission time in accordance with the present invention, the signal indicating unit includes light emitting devices for indicating the states of the signals in the transmission path by means of lights. The signal detecting means includes light receiving units for receiving light signals emanating from the light emitting devices and converting them into electrical signals, and comparing means for comparing the patterns of electrical signals sent from the light receiving units with a given pattern registered in advance, and checking if both patterns coincide with each other. When both patterns coincide with each other, it is recognized that at least one of the first and second signals has been detected.

More preferably, in the apparatus for measuring transmission time in accordance with the present invention, the results of detection of the first and second signals performed by the signal detecting means are output in the form of electrical signals.

More preferably, in the apparatus for measuring transmission time in accordance with the present invention, the results of detection of the first and second signals performed by the signal detecting means are output in the form of light emissions from associated light emitting devices.

More preferably, the apparatus for measuring transmission time in accordance with the present invention further comprises an instantaneous synchronization timing generating means for generating a timing signal to be used to sample data sent from the observation station on the basis of the first and second signals within a predetermined time interval.

Alternatively, an apparatus for measuring transmission time, utilized for a data collection system in accordance with the present invention, is used for a data collection system including an observation station situated in a given region, a collection station for collecting data sent from the observation station over a transmission line, and a signal indicating unit for indicating the states of arbitrary signals to be transmitted through a transmission path within the transmission line, and the above apparatus is designed for measuring the transmission time necessary for the signal to propagate through the transmission path. The apparatus comprises a signal detecting means for taking out, from the signal indicating unit, and detecting a specific signal relevant to data collection in a state in which the data collection system is kept running and the electrically uncoupled state relative to the transmission path is retained. The signal detecting means inputs a reference signal that is different from the signal relevant to data collection.

The apparatus for measuring transmission time further comprises a transmission time calculating means for calculating the transmission time of a signal propagating the transmission path on the basis of a difference between the time instant at which the specific signal is detected and the time instant at which the reference signal is detected.

Preferably, in the apparatus for measuring transmission time in accordance with the present invention, the signal indicating unit includes a light emitting device for indicating the state of the signal in the transmission path by means of lights. The signal detecting means includes a light receiving unit for receiving a light signal emanating from the light emitting device and converting it into an electrical signal, and a comparing means for comparing the pattern of an electrical signal sent from the light receiving unit with a given pattern registered in advance and checking if both patterns coincide with each other. When both patterns coincide with each other, it is recognized that the specific signal relevant to data collection has been detected.

More preferably, in the apparatus for measuring transmission time in accordance with the present invention, the reference signal is input as an electrical signal to the signal detecting means.

More preferably, in the apparatus for measuring transmission time in accordance with the present invention, the reference signal is a light signal stemming from light emissions and the light signal is input to the signal detecting means.

More preferably, the apparatus for measuring transmission time in accordance with the present invention further comprises an instantaneous synchronization timing generating means for generating a timing signal to be used to sample data sent from the observation station, on the basis of the specific signal relevant to data collection and the reference signal within a predetermined time interval.

According to the apparatus for measuring transmission time in accordance with the present invention, the signal indicating unit having light emitting devices or the like, such as the one mounted on the front side of a modulating/demodulating device or the like in a data collection system such as an earthquake observation system, can fetch signals that are to be measured or signals that are objects of transmission time measurement in a state in which the data collection system is kept running and the electrically uncoupled state relative to the transmission path is retained. The transmission time of a signal can therefore be measured readily and highly accurately without interrupting a continuity of the system operation.

According to the apparatus for measuring transmission time in accordance with the present invention, detection of a data sampling start command sent from a collection station and detection of a data return notice can be executed outside a system by utilizing optical coupling with a mechanism for indicating the state of each signal. This makes it possible to readily and quickly produce a sync signal conformable to a transmission mode employed in a data collection system according to an instantaneous synchronization generating method. Consequently, interlocked observation of other various general-purpose equipment can be executed.

BRIEF DESCRIPTION OF THE DRAWINGS

The above object and features of the present invention will be more apparent from the following description of the preferred embodiments with reference to the accompanying drawings, wherein:

FIG. 5 is a circuit block diagram (part 2) showing the configuration of an exemplary embodiment of the present invent ion;

FIG. 10 is a circuit block diagram showing the configuration of another exemplary embodiment of the present invention.

DESCRIPTION OF THE PREFERRED EMBODIMENTS

Figure 3:
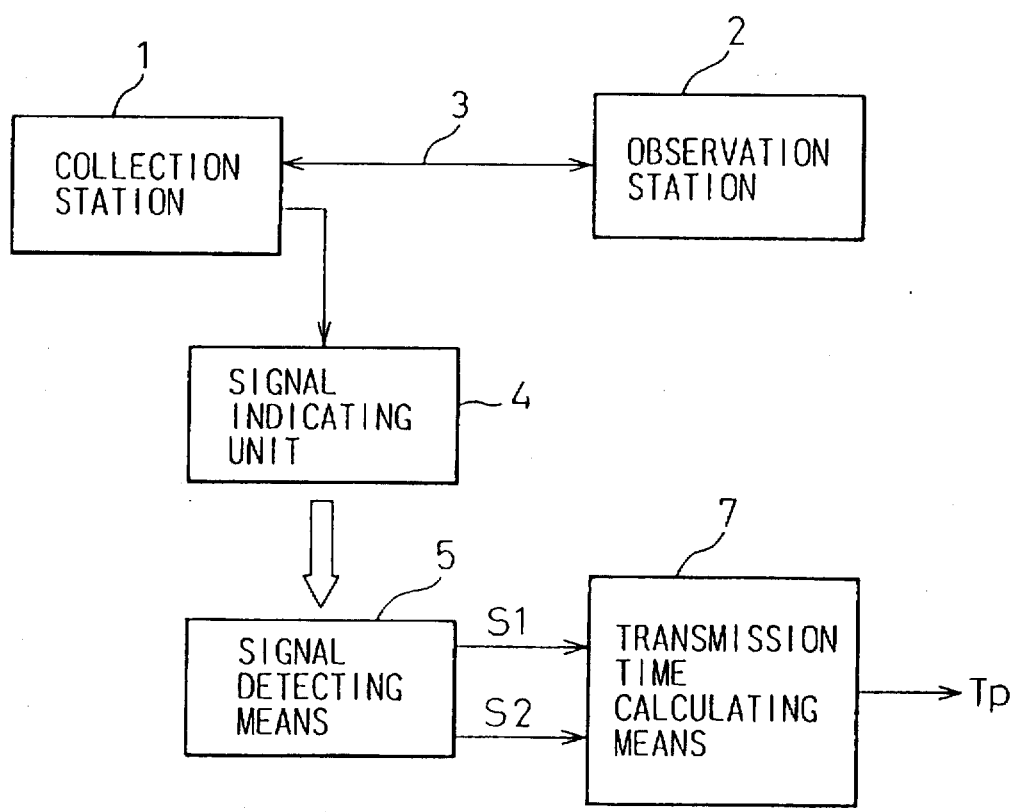
FIG. 3 is a block diagram showing the configuration of an embodiment based on the principle of the present invention.

Hereinafter, a detailed description regarding preferred embodiments of the present invention will be given with reference to FIGS. 3 to FIG. 3 is a block diagram showing the configuration of an embodiment based on the principle of the present invention.

Herein, a collection station 1 may or may not include a modulating/demodulating device. An observation station 2 may or may not include a modulating/demodulating device, either.

As shown in FIG. 3, an apparatus for measuring transmission time in accordance with the embodiment based on the principle of the present invention is utilized for a data collection system including a single observation station or a plurality of observation stations 2 situated in a given region or given regions, a single collection station 1 for collecting data sent from the observation station 2 over a transmission line 3, and a signal indicating unit 4 for indicating the slates of arbitrary signals to be transmitted through a transmission path within the transmission line 3, and is designed for measuring the transmission time necessary for the arbitrary signal to propagate through the transmission path. To be more specific, the apparatus for measuring transmission time shown in FIG. 3 has a signal detecting means 5 for taking out, from the signal indicating unit 4, and detecting a first signal S1 to be sent from the collection station 1 to the observation station 2 in order to start data collection and a second signal S2 to be returned from the observation station 2 to the collection station 1 in order to notify that the first signal S1 has been received, in a state in which the data collection system is kept running and the electrically uncoupled state relative to the transmission path is retained.

The apparatus for measuring transmission time shown in FIG. 3 further comprises a transmission time calculating means 7 for calculating the transmission time of a signal propagating through the transmission path within the transmission line 3 on the basis of a difference between the time instant at which the first and second signals are detected.

Preferably, the signal indicating unit 4 includes light emitting devices for indicating the states of arbitrary signals in the transmission path within the transmission line 3 using lights. The signal detecting means 5 includes light receiving units for receiving light signals emanating from the light emitting devices and converting them into electrical signals, and comparing means for comparing the patterns of electrical signals sent from the light receiving units with a given pattern registered in advance and checking if both patterns coincide with each other. If both patterns coincide with each other, it is recognized that at least one of the first and second signals has been detected.

More preferably, the results of detection of the first and second signals performed by the signal detecting means 5 are output in the form of electrical signals.

Alternatively, the results of detection of the first and second signals performed by the signal detecting means 5 are output in the form of light emissions from associated light emitting devices.

More preferably, an instantaneous synchronization timing generating means is provided for generating a timing signal to be used in sampling data sent from the observation station 2 on the basis of the first and second signals within a predetermined time interval.

In the block diagram of FIG. 3, a specific signal relevant to data collection (for example, either the first signal S1 or second signal S2) and a reference signal that is different from the signal relevant to data collection may be used instead of the two kinds of signals relevant to data collection; that is, the first signal S1 and second signal S2.

In this case, the apparatus for measuring transmission time shown in FIG. 3 comprises a signal detecting means for taking out, from the signal indicating unit 4, and detecting the specific signal relevant to data collection, in a state in which the data collection system is kept running and the electrically uncoupled state relative to the transmission path is retained. The signal detecting means inputs the reference signal that is different from the signal relevant to data collection.

The apparatus for measuring transmission time shown in FIG. 3 further comprises a transmission time calculating means for calculating the transmission time of a signal propagating the transmission path on the basis of a difference between the time instant at which the specific signal is detected and the time instant at which the reference signal is detected.

Preferably, the signal indicating means 4 includes a light emitting device for indicating the state of an arbitrary signal in the transmission path within the transmission line 3 using lights. The signal detecting means includes a light receiving unit for receiving a light signal emanating from the light emitting device and converting it into an electrical signal; and a comparing means for comparing the pattern of the electrical signal sent from the light emitting device with a given pattern registered in advance and checking if both patterns coincide with each other. When both patterns coincide with each other, it is regarded that the specific signal relevant to data collection has been detected.

More preferably, the reference signal is input as an electrical signal to the signal detecting means.

Alternatively, the reference signal is a light signal stemming from light emissions and the light signal is input to the signal detecting means.

Even in this case, an instantaneous synchronization timing generating means is provided for generating a timing signal to be used to sample data sent from the observation station 2 on the basis of the specific signal relevant to data collection and the reference signal within a predetermined time interval.

For clarifying the features of the embodiment of the apparatus for measuring transmission time in accordance with the present invention shown in FIG. 3, a procedure, for performing measurement of the transmission time of a signal propagating through the transmission path, for example, the delay time of a signal occurring during data transmission, detection of a sync bit string, taking out of signals that are to be measured, and generation of a timing signal, will be described in more detail, also with reference to FIG. 2 mentioned above. Herein, the description proceeds on the assumption that the first signal for use in starting data collection and the second signal for use in notifying reception of the first signal are employed.

(1) Measuring the delay time

Figure 2:
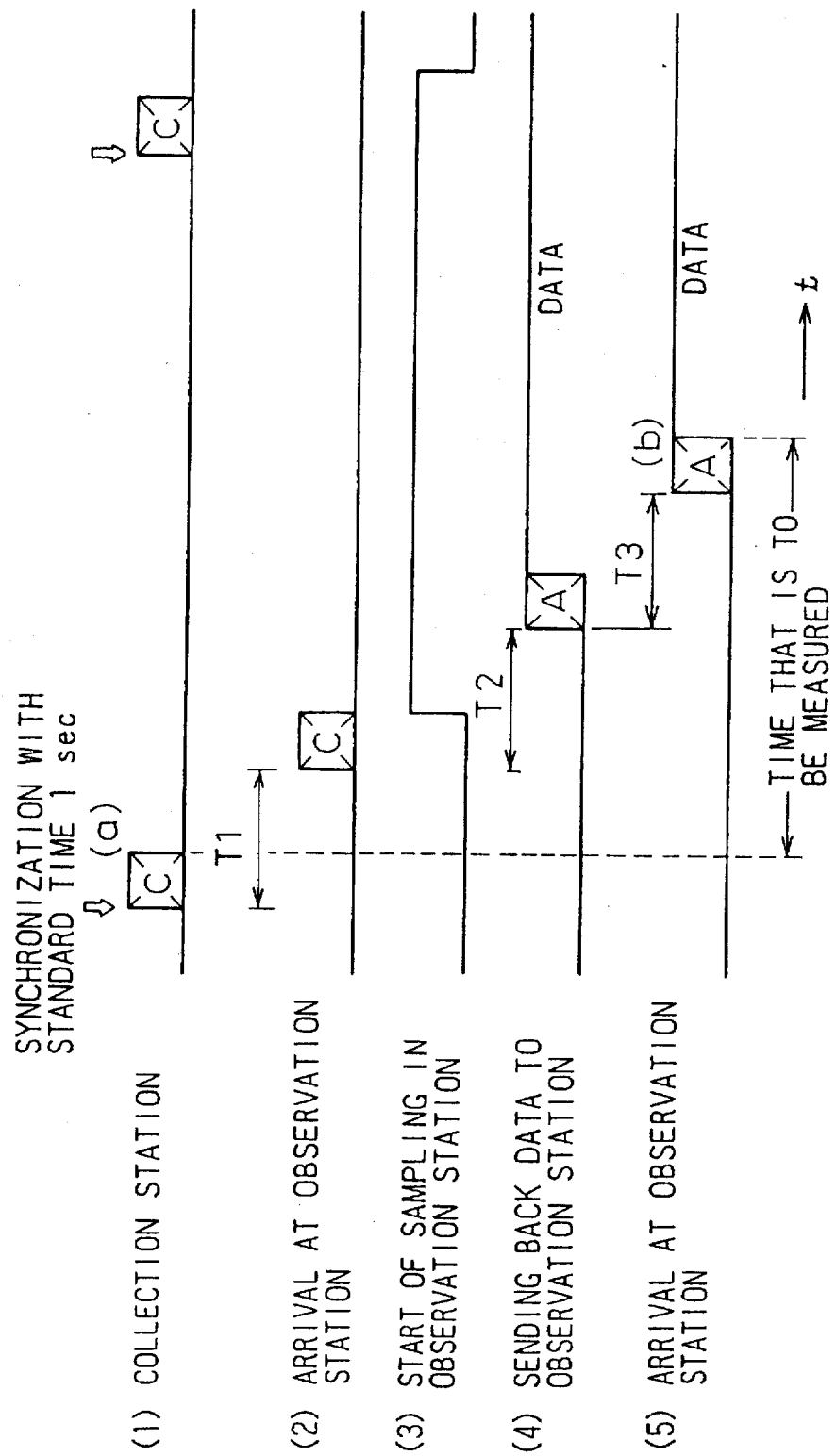
FIG. 2 is a timing chart for explaining a data transmission protocol in the conventional data collection system.

As described in conjunction with FIG. 2, the total delay time occurring in a data flow, as a whole, of a conventional data collection system is calculated by adding up time intervals T1, T2, and T3. The delay time is expressed as a time interval from the start point of the signal C (first signal) in FIG. 2 [portion (1)] to the start point of the signal A (second signal) in FIG. 2 [portion (5)]. The signals C and A cannot be detected until their end points or last bits come.

Figure 1:
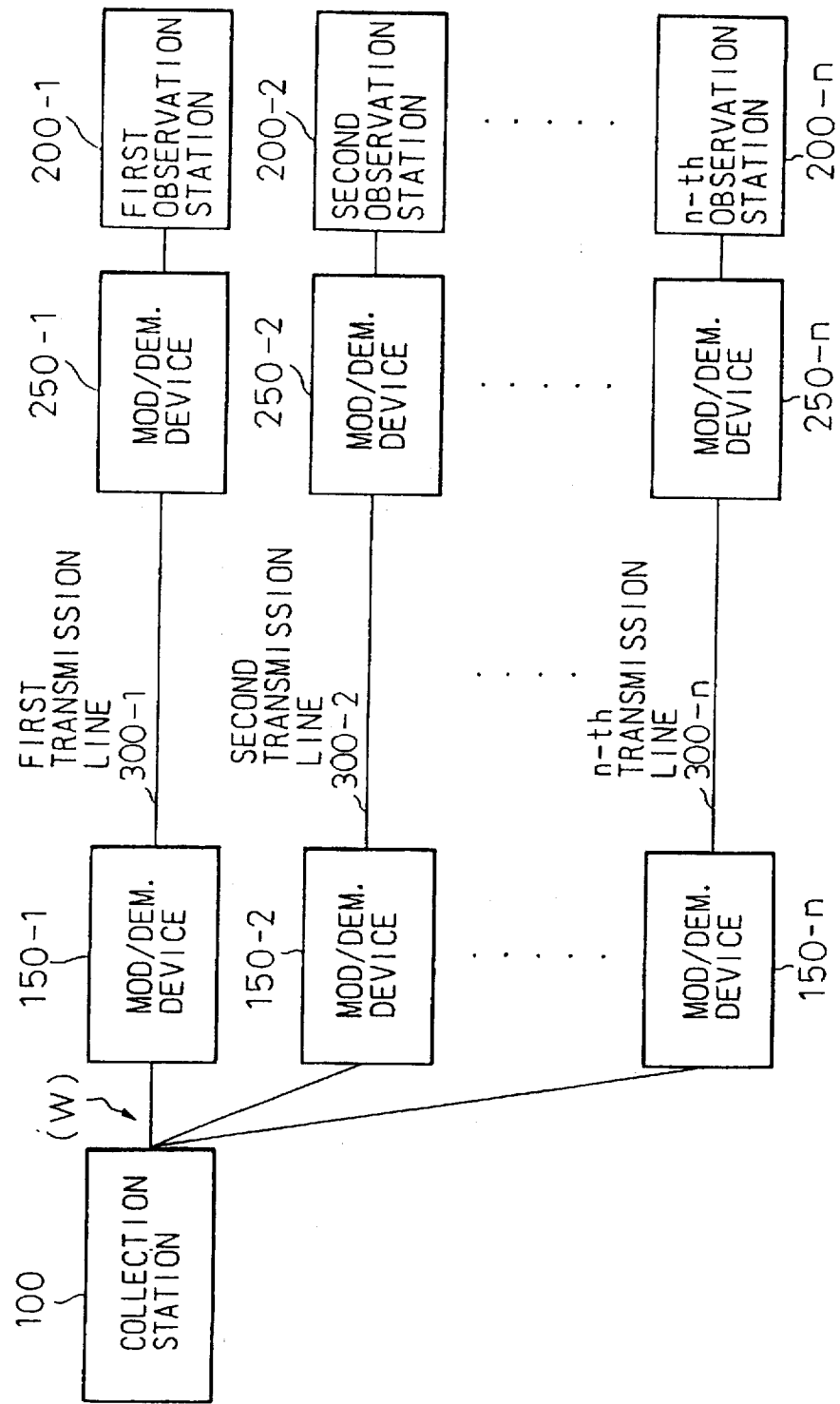
FIG. 1 is a block diagram showing the configuration of a conventional data collection system.

In the aforesaid example of a system shown in FIGS. 1 and 2, the bit lengths of signals C and A are equal to each other. Measurement of the delay time should be concerned with a time interval from (a) to (b) in FIG. 2.

The embodiment of the apparatus for measuring transmission time in accordance with the present invention shown in FIG. 3 is characterized in that the total delay time occurring in the whole system is, as described previously, measured by calculating a time interval from the time of detection of a data sampling start command (signal C) sent from a collection station to the time of detection of a return notice (signal A) returned from an observation station.

When a collection station and observation station include a modulating/demodulating device, a delay attributable to each modulating/demodulating device can be set to a specific value for each of various modes. The processing time of each observation apparatus is set to a fixed value according to the conditions for design. The delay time occurring in a transmission path within a transmission line is worked out by subtracting the total processing time from the total delay time.

(2) Detecting a sync bit string

Measurement of the delay time that is an object of the present invention is, as described previously, carried out by detecting a data sampling start signal (signal C) formed with a specific bit string and a return notice (signal A) returned from an observation station. To be more specific, when this kind of signal detection is executed, first, a first signal (typically, a sent data signal SD which is to be described later) sent from a collection station and a second signal (typically, a returned data signal RD which is to be described later) sent from an observation station are held on a time-series basis in a holding circuit or the like, which permits the same bit length as those of signals C and A, synchronously with a clock having a fundamental (reference) frequency (using, for example, a shift register). Thereafter, a comparing means having a comparator or the like compares the result held in the holding circuit or the like with a pre-set (pre-registered) specific bit string synchronously with each clock. Based on the result of comparison, it is verified whether or not the result agrees with the pre-set specific bit string.

In the foregoing clock-by-clock time-series signal comparison, detection can be achieved for approximately 10 nanoseconds ($10^{-8}$ sec.) owing to the speeds of logical elements constituting a circuit. The speed of the signal detection is sufficiently high for the precision 0.1 millisecond ($10^{-2}$ sec.) required of delay time measurements of the present invention.

(3) Taking out signals that are to be measured

Signals serving as objects of measurement are two kinds of signals; a first signal to be sent from a collection station to an observation station (for example, a sent data signal SD to be described later) and a second signal coming from the observation station to the collection station (for example, a returned data signal RD to be described later).

These signals can be taken out at a position indicated with a symbol (W) in FIG. 1. However, taking out signals at the position (W) is inappropriate in terms of the assurance of continuity of system operation, because observation operations performed at the observation station must temporarily stop for the connection of a measuring equipment.

The embodiment of the apparatus for measuring transmission time in accordance with the present invention shown in FIG. 3 is characterized mainly by the fact that the aforesaid drawbacks, concerning measurement of transmission time within a transmission line, are resolved.

A signal indicating unit (for example, a mechanism for indicating the state of each signal), for indicating the states of arbitrary signals to be transmitted through a transmission path within a transmission line, is mounted on the front side of a modulating/demodulating device in an observation station in a conventional data collection system. The aforesaid two signals can be visually discerned by utilizing light emitting devices such as light emitting diodes (LED) of the signal indicating unit (See FIG. 8 that will be described later).

In other words, the embodiment of the apparatus for measuring transmission time in accordance with the present invention shown in FIG. 3 is characterized in that object signals are taken out from the mechanism for indicating the state of each signal by means of, for example, optical coupling dependent on the light emitting devices in a state in which the electrically uncoupled state relative to a transmission path within a transmission line is retained.

The light emitting devices, mounted in the signal indicating unit and used for visual check, are light emitting diodes substantially without exception because of their long service lives and the trend toward compact devices. The light emitting diodes have the most remarkable advantage of high response speed, as well as the above-mentioned merits. The present invention utilizes this advantage, and is based on an arrangement in which light, emitted when a light emitting device in the mechanism for indicating the state of each signal mounted on a modulating/demodulating device or the like flickers according to data propagating through a transmission path, is taken out as a light signal, then converted into an electrical signal, and thus the data is sampled by sampling the electrical signal at high speed.

(4) Generating a sync signal

For sampling data on the basis of first and second signals taken out from a modulating/demodulating device or the like, it is necessary to generate a timing (sync) signal on the basis of the first and second signals.

In an ordinary modulating/demodulating device, for the generation of a timing signal, the fundamental frequencies of the first and second signals (for example, a sent data signal SD and returned data signal RD) are sampled by means of a phase-controlled synchronous oscillator PLL (abbreviation of phase-locked loop which will be mentioned later) oscillator or the like. Under the conditions set in this system, the time, required before synchronous stabilization is attained, is relatively long. This system is therefore unsuitable for measurement. In the present invention, an instantaneous synchronization timing generating method is therefore newly adopted.

In a preferred embodiment derived from the basic embodiment shown in FIG. 3, it is possible to include an instantaneous synchronization timing generating means for generating a timing signal to be used to sample data sent from the observation station 2 on the basis of first and second signals within a predetermined time interval.

In an ordinary modulating/demodulating device, signals, whose frequencies correspond to the fundamental frequencies of the first and second signals, are sampled by a phase-controlled synchronous oscillator, and then a timing signal is generated. This kind of phase-controlled synchronous oscillator utilizes integration and therefore requires a long time interval for attaining synchronous stabilization. The phase-controlled synchronous oscillator is therefore unsuitable for measurement under the condition requesting high accuracy for delay time measurement; such as, the condition of a data collection system such as an earthquake observation system in which the present invention is implemented. An apparatus for measuring transmission time in accordance with the present invention therefore newly adopts an instantaneous synchronization timing generating method using an instantaneous synchronization timing generating means.

According to an extended application of the basic embodiment of the present invention shown in FIG. 3, a reference signal (for example, a standard time ticking signal) is input to a signal detecting means in an apparatus for measuring transmission time in order to measure a delay relative to the reference signal. Thus, the delay time occurring in a transmission path can be measured for each direction.

In short, in the embodiment of the present invention shown in FIG. 3, the employment of a signal indicating unit 4 having light emitting devices or the like, such as the one mounted on the front side of a modulating/demodulating device or the like in a general data collection system, makes it possible to fetch signals that are to be measured or signals that are objects of transmission time measurement in a state in which a data collection system is kept running and the electrically uncoupled state relative to a transmission path is retained. The transmission time of a signal can be measured readily and highly accurately without interfering a continuity with the system operation.

A standard time ticking signal is inserted as a reference signal to an apparatus for measuring transmission time. A delay relative to the reference signal can therefore be measured. This makes it possible to measure the transmission time of a signal over a transmission line for each direction, and to calculate the transmission time of a signal with higher accuracy than the case in which two kinds of object signals are used together for measuring the transmission time.

Figure 4:
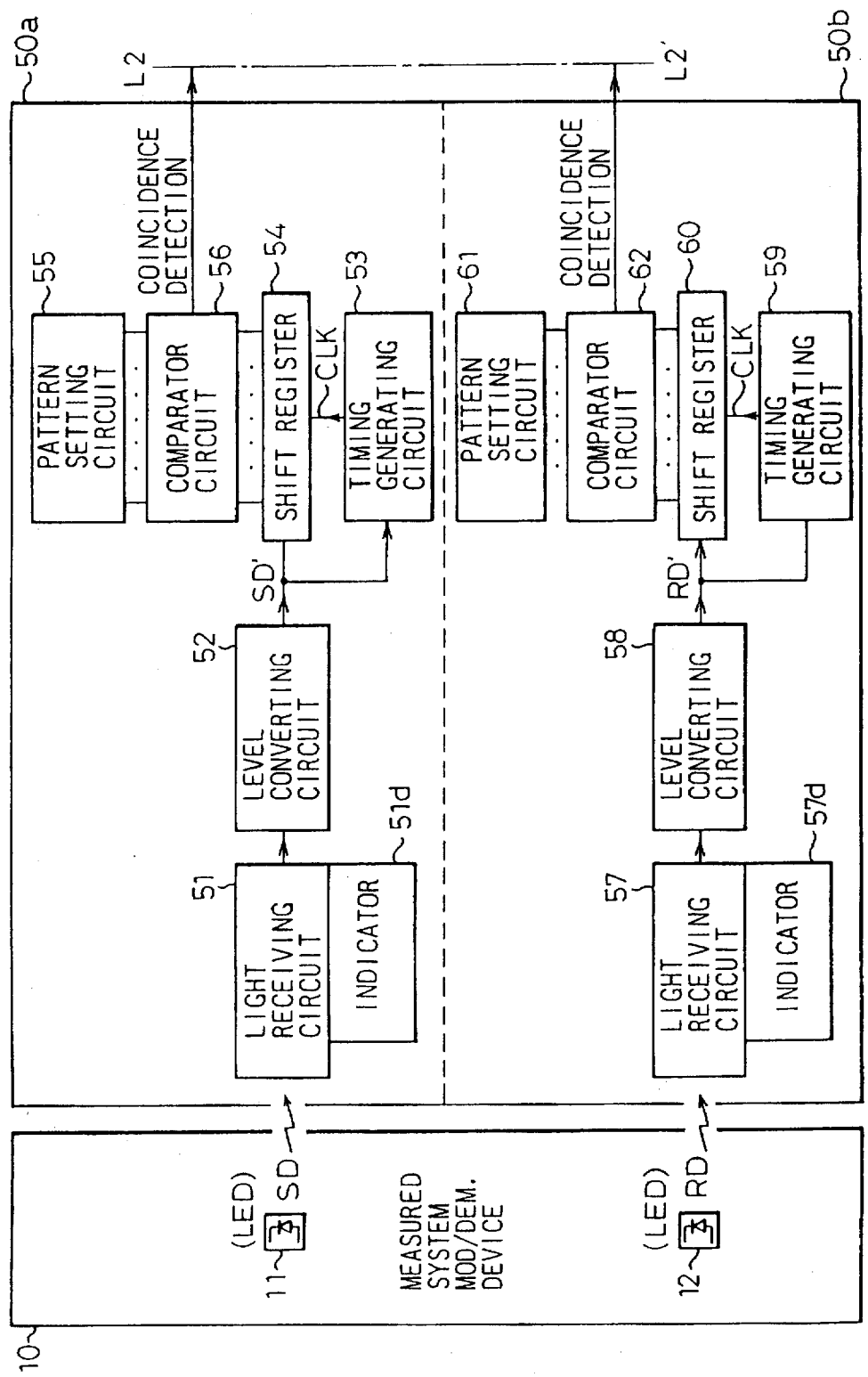
FIG. 4 is a circuit block diagram (part 1) showing the configuration of an exemplary embodiment of the present invention.

FIGS. 4 and 5 are circuit block diagrams (parts 1 and 2) showing the configuration of an exemplary embodiment of the present invention. Hereinafter, components identical to those described previously will be assigned the same reference numerals.

In a part of the embodiment of an apparatus for measuring transmission time in accordance with the present invention shown in FIG. 4, signal indicators 11 and 12 are provided as the signal indicating unit 4 (FIG. 3), which takes out signals from a transmission path by means of optical coupling, in a measured system modulating/demodulating device 10 inside an observation station (or collection station). Each of the signal indicators 11 and 12 has a structure in which a light emitting diode or the like seen on a mechanism for indicating the state of each signal, which will be described later (FIGS. 8 and 9), is incorporated, and is designed so that every time a signal passes through a transmission path, the light emitting diode or the like emits lights at high response speed. In this case, one of the signal indicators shown in FIG. 4 or the signal indicator 11 supplies a sent data signal SD corresponding to the aforesaid signal C (See FIG. 2) in the form of a light signal. The other signal indicator or the signal indicator 12 supplies a returned data signal RD corresponding to the aforesaid signal A (See FIG. 2) in the form of a light signal. The configuration and functions of the exemplary embodiment of the present invention will be described according to the flow of the sent data signal SD and returned data signal RD.

(1)' Signal flow of a sent data signal SD

In FIG. 4, reference numeral 50a denotes a sent data signal detecting unit constituting a part of the signal detecting means 5 (FIG. 3). The sent data signal detecting unit 50a includes a light receiving circuit 51 having a light receiving device such as a phototransistor or photodiode. The light receiving circuit 51 outputs an electrical signal proportional to the intensity of a sent data signal SD supplied from the signal indicator 11 in the form of a light signal. An indicator 51d is provided for a visual check of the received state of a light signal in the light receiving circuit 51.

The sent data signal detecting unit 50a further comprises a level converting circuit 52. The level converting circuit 52 is formed with a threshold circuit, samples an output of the light receiving device in the light receiving circuit 51 with respect to a threshold permitting the least signal distortion, and thus achieves level conversion to supply an electrical signal SD' to a succeeding circuit. The light receiving circuit 51 and level converting circuit 52 constitute a major portion of the light receiving unit of the present invention.

In the output stage of the level converting circuit 52, a timing generating circuit 53 and shift register 54 are connected. The timing generating circuit 53 is a clock generator for outputting a clock CLK for use in actuating the shift register 54, and has the capability of a synchronous oscillator realized with a phase locked feedback control oscillator [also referred to as a phase-locked loop (usually abbreviated to PLL)]. For example, the synchronous oscillator produces a signal having a frequency of 2,400 hertz (Hz) and locked onto the sent data signal SD in terms of transmission speed and phase.

The shift register 54 is a 24-bit shift register for converting a series signal sent from the level converting circuit 52 into a parallel signal. The reason why the shift register 54 is a 24-bit shift resister is that the data sampling start command (signal C in FIG. 2) is 24 bits long.

The sent data signal detecting unit 50a further comprises a pattern setting circuit 55. The pattern setting circuit 55 is a circuit for setting a bit string in advance for the purpose of detecting a data sampling start command. In the pattern setting circuit 55, a 24-bit pattern string can be set arbitrarily. Specifically, the pattern setting circuit 55 is realized with a DIP (dual-in-line package) switch or digital switch. The DIP switch or the like is manipulated to designate a logical "1" or "0" state, thus setting a pattern string of 24 bits.

The sent data signal detecting unit 50a further comprises a comparator circuit 56 functioning as the comparing means of the present invention. The comparator circuit 57 is a comparator for collating the contents of the shift register 54 with a bit string set in the pattern setting circuit 55, and composed of 24 exclusive OR circuits (usually, EXORs).

Collation performed by the comparator circuit 56 is carried out for each bit of a series signal. When the contents of the shift register coincide with a pre-set bit string for all the 24 bits, a coincidence detection signal is output. The output of the coincidence detection signal means that a data sampling start command has been issued.

(2)' Signal flow of a returned data signal RD

In FIG. 4, reference numeral 50b denotes a returned data signal detecting unit constituting part of the signal detecting means 5 (FIG. 3). The configuration and functions of the returned data signal detecting unit 50b are substantially identical to those of the aforesaid sent data signal detecting unit 50b. The configuration and functions of the returned data signal detecting unit 50b will be described according to the flow of a returned data signal RD.

The returned data signal detecting unit 50b in FIG. 4 includes a light receiving circuit 57 having a light receiving device such as a phototransistor or photodiode. The light receiving circuit 57 outputs an electrical signal proportional to the intensity of a returned data signal RD supplied from the signal indicator 12 in the form of a light signal. An indicator 57d is provided for a visual check of the received state of a light signal in the light receiving circuit 57.

The returned data signal detecting unit 50b further comprises a level converting circuit 58. The level converting circuit 58 is formed with a threshold circuit, samples an output of the light receiving device in the light receiving circuit 57 with respect to a threshold permitting the least signal distortion, and thus achieves level conversion to supply an electrical signal RD' to a succeeding circuit. The light receiving circuit 57 and level converting circuit 58 constitute a major portion of the light receiving unit of the present invention.

In the output stage of the level converting circuit 58, a timing generating circuit 59 and shift register 60 are connected. The timing generating circuit 59 is a clock generator for outputting a clock CLK for use in actuating the shift register 60, and has the capability of a synchronous oscillator realized with a phase locked feedback control oscillator. For example, the synchronous oscillator generates, similarly to the one for the sent data signal SD, a signal having a frequency of 2,400 hertz (Hz) and locked onto the returned data signal RD in terms of transmission speed and phase.

The shift register 60 is a 24-bit shift register for converting a series signal sent from the level converting circuit 58 into a parallel signal. The reason why the shift register 60 is formed with a 24-bit shift register is that a data return notice (signal A in FIG. 2) is 24 bits long.

The returned data signal detecting unit 50b further comprises a pattern setting circuit 61. The pattern setting circuit 61 is a circuit for setting a bit string in advance for the purpose of detecting a data return notice. In the pattern setting circuit 61, a pattern string of 24 bits can be set arbitrarily. Specifically, the pattern setting circuit 61 is, similarly to the aforesaid pattern setting circuit 55, realized with a DIP switch or digital switch. The DIP switch or the like is manipulated to designate the logical "1" or "0" state for each bit, thus setting a pattern string of 24 bits.

The returned data signal detecting unit 50b further comprises a comparator circuit 62 that functions as the comparing means of the present invention in cooperation with the aforesaid comparator circuit 56. The comparator circuit 62 is a comparator for collating the contents of the shift register 60 with a bit string set in the pattern setting circuit 61, and is composed of 24 exclusive OR circuits.

The collation performed by the comparator circuit 62 is carried out for each bit of a serial signal. When the contents of the shift register coincide with a pre-set bit string for all the 24 bits, a coincidence detection signal is output. The output of the coincidence detection signal means that a data return notice has been received.

In the other part of the embodiment of the present invention shown in FIG. 5, a counter unit 70 is provided as the transmission time counting means 7 (FIG. 3) for calculating the transmission time of a signal propagating a transmission path. The counter unit 70 comprises a gated flip-flop (usually abbreviated to F/F) 73, a reference frequency oscillator 74, counter circuit 75, and count indicator 76. These components have the abilities described below.

First, the flip-flop 73 is a set-reset (RS) type flip-flop and has the ability to keep a gate of the counter circuit 75 open during a time period from the time when a data sampling start command is issued through the time when a data return notice is received.

Second, the reference frequency oscillator 74 is a high-precision oscillator for advancing the counter circuit 75 step by step. The reference frequency oscillator 74 ensures a precision of ±3 ppm through temperature compensation. For example, the number of digits of an indication on the reference frequency oscillator 74 is 4 and ½ (i.e., four and a half digits). In the reference frequency oscillator 74, the frequency of a signal supplied to the counter circuit 75 is set to 10 kilohertz (kHz) in order to ensure a measurement resolution of 0.1 millisecond ($10^{-4}$ sec.).

Third, the counter circuit 75 is a decimal 5-digit counter and counts pulses sent from the reference frequency oscillator 74 during a period during which the gate is open. The result of counting performed by the counter circuit 75 is conveyed to the count indicator 76 according to the timing that the gate is closed or the timing that a data return notice is received.

Fourth, the count indicator 76 is a 5-digit numerical indicator for indicating the result of counting. The count indicator 76 receives the result of counting according to the timing that the gate in the counter circuit 75 is closed, and holds the indication until the next result is received.

Figure 6:
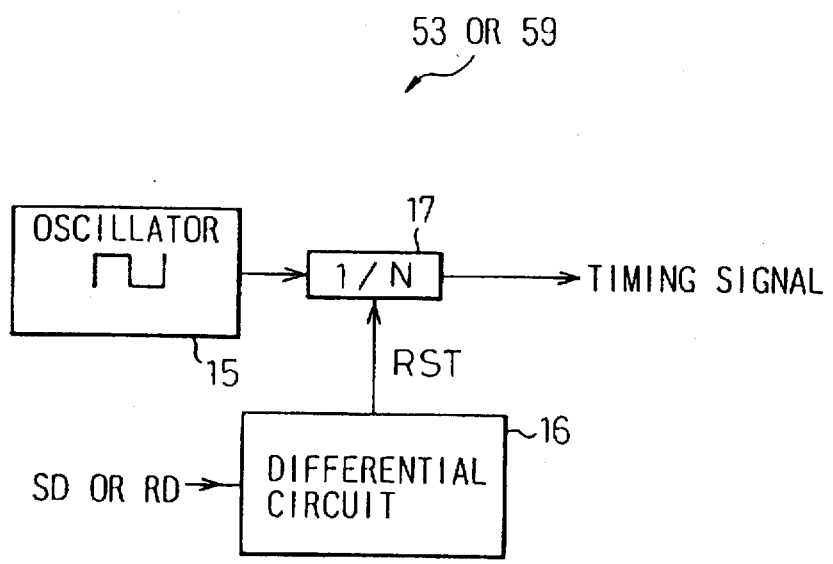
FIG. 6 is a circuit block diagram showing an example of a timing generating circuit shown in FIG. 4.
Figure 7:
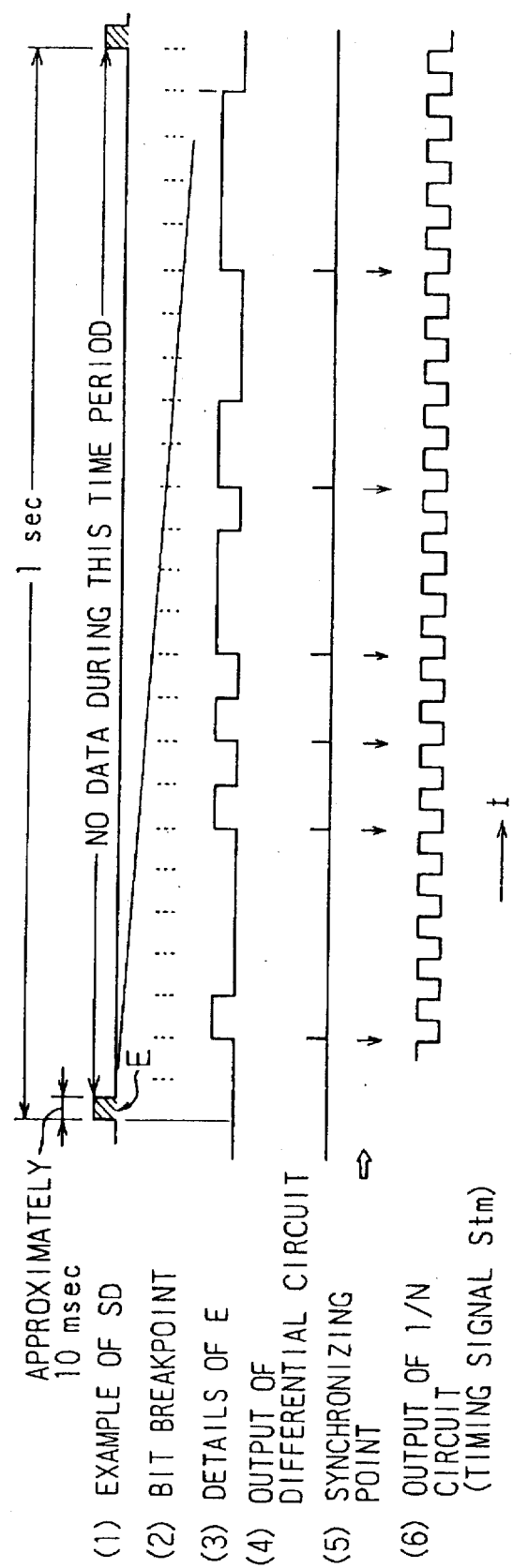
FIG. 7 is a timing chart for explaining the operation of the timing generating circuit shown in FIG. 6.

FIG. 6 is a circuit block diagram showing an example of the timing generating circuit shown in FIG. 4. FIG. 7 is a timing chart for explaining the operation of the timing generating circuit shown in FIG. 6. FIG. 6 shows an example of the more detailed configuration of the timing generating circuit 53 (or 59) shown in FIG. 4. FIG. 7 illustrates the operations of the components of the timing generating circuit 53 along a time axis t.

The timing generating circuit 53 (or 59) in FIG. 6 comprises an oscillator 15 for producing a reference signal having a high-precision fundamental frequency, a 1/N circuit 17 for performing frequency division on the reference signal sent from the oscillator 15 so as to produce a signal (that is, a timing signal Stm) whose frequency is 1/N of the fundamental frequency of the reference signal, and a differential circuit 16 for differentiating the sent data signal SD (or the returned data signal RD) to produce a reset signal RST and inputting the reset signal RST to the 1/N circuit 17.

The object of the timing generating circuit is to generate a timing signal for use in judging the polarity of data on the basis of the sampled sent data signal SD (or the returned data signal RD).

The present invention adopts the instantaneous synchronization timing generating method in which synchronization is achieved instantaneously at every leading edge of the sampled sent data signal SD (or the returned data signal RD).

As described so far, the employment of a phase-controlled synchronous oscillator (or PLL) used in an ordinary modulating/demodulating device makes it possible to sample signals whose frequencies correspond to the fundamental frequencies of the sent data signal SD and returned data signal RD and to produce a timing signal. However, since this kind of phase control synchronous oscillator utilizes integration, the time required for synchronous stabilization is relatively long. The phase-controlled synchronous oscillator may be unsuitable for measurement, under the condition requiring high-precision delay time measurement; such as, under the condition set in a data collection system in which the present invention is implemented. In a preferred embodiment of the present invention, the instantaneous synchronization timing generating method, using an instantaneous synchronization timing generating means, is adopted.

To be more specific, as seen from the example of a sent data signal SD in a portion (1) of FIG. 7, the signal C representing a data sampling start command has an effective signal E (enlarged in a portion (3) of FIG. 7) having a period of approximately 10 millisecond ($10^{-2}$ sec.) in a time interval of 1 sec. (one sec.). The remaining period is a quiescent period. In the phase control method, a long time is required to attain synchronism. It therefore takes much time to perform a measurement. The instantaneous synchronization timing generating method is a method effective for avoiding this drawback.

In the apparatus for measuring transmission time in accordance with the present invention, as shown in FIG. 7, reset is effected for every at interval of one sec. From the viewpoint of the gist of the present invention, it is unnecessary to follow a signal that is out of synchronism in which the signal should be locked onto a reference signal. The instantaneous synchronization timing generating method is therefore adopted.

A portion (2) of FIG. 7 shows bit breakpoints of the sent data signal SD (or the returned data signal RD).

For detecting a series signal correctly using the apparatus for measuring transmission time in accordance with the present invention, the sent data signal SD (or the returned data signal RD) must be sampled in the vicinity of a middle point between bit breakpoints.

The cycle of bit breakpoints is defined by the oscillator 15 and the 1/N circuit 17 shown in FIG. 6 on the basis of a cycle defined by a system or modulating/demodulating device that is an object of testing for transmission time measurement. As shown in a portion (4) of FIG. 7, a differentiated output of the sent data signal SD (or the returned data signal RD) fed to the differential circuit 16 is used to reset the 1/N circuit 17, whereby the timing signal Stm supplied from the 1/N circuit 17 is synchronized with the effective signal E of the sent data signal SD (or the returned data signal RD) (See portion (5) of FIG. 7).

In the aforesaid embodiment, the timing signal Stm sent from the 1/N circuit 17 (See portion (6) of FIG. 7) has a repetition frequency of 2,400 Hz. The oscillator 15 is formed with a crystal transducer and can ensure a precision in oscillation frequency of about $10^{-4}$. A period in which the sent data signal SD is out of synchronism occurring due to free-running of the oscillator 15 during the quiescent period of 990 milliseconds (0.99 sec.) of the sent data signal SD is a value sufficiently shorter than a time interval between bit breakpoints.

Also shown in FIG. 5 is a power supply unit 8 including a power supply circuit 80 for supplying power to the other circuits in the apparatus for measuring transmission time. The power supply circuit 80 generates a direct current (DC) +5 V necessary for each circuit using an alternating current (AC) 100 V. The power supply circuit 80 adopts a floating charge method using a secondary battery and is also usable with a battery.

Next, the situation in which an embodiment of the present invention is actually employed in a data collection system will be introduced.

Figure 8:
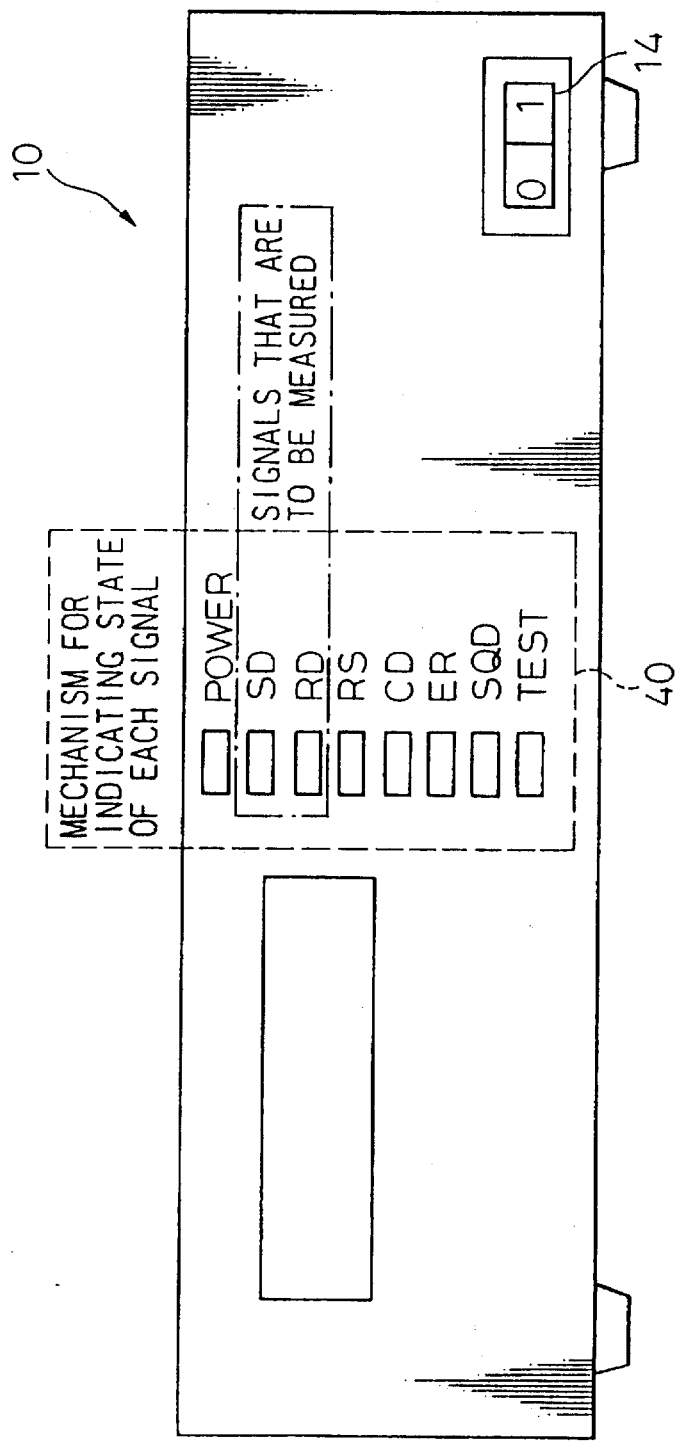
FIG. 8 is a schematic view showing a mechanism for indicating the state of each signal for a modulating/demodulating device that is an object of testing undertaken by the apparatus for measuring transmission time in accordance with the present invention.
Figure 9:
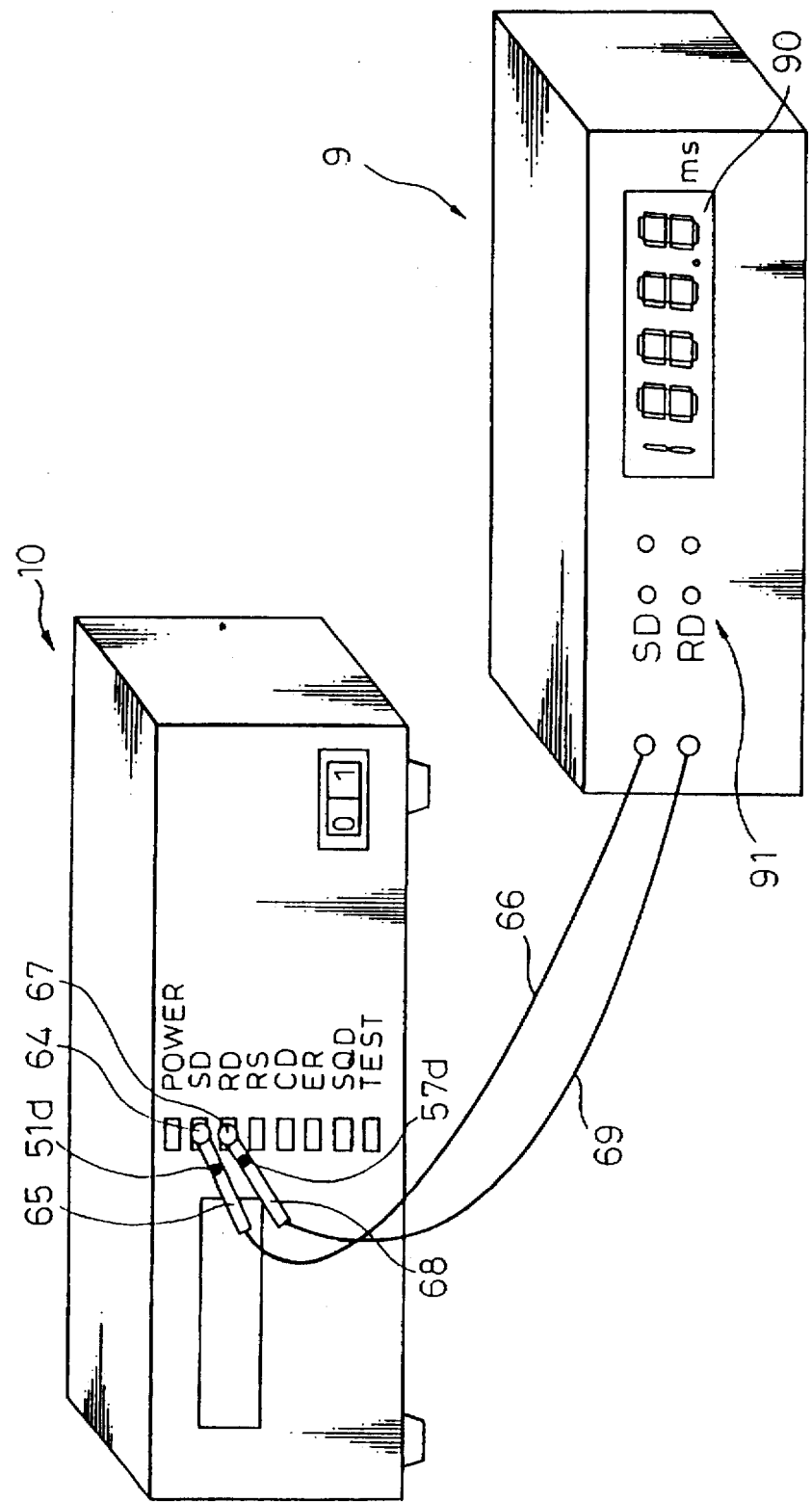
FIG. 9 is a schematic view showing the use state of the apparatus for measuring transmission time in accordance with the present invention.

FIG. 8 is a schematic view showing a mechanism for indicating the state of each signal for a modulating/demodulating device that is an object of testing of the apparatus for measuring transmission time in accordance with the present invention. FIG. 9 is a schematic view showing a use state of the apparatus for measuring transmission time in accordance with the present invention.

As shown in FIG. 8, in addition to a power switch 14, a mechanism 40 for indicating the state of each signal, which indicates the states of various signals to be transmitted through a transmission path within a transmission line, are mounted on the front side of the measured system modulating/demodulating device that is an object of testing performed by the apparatus for measuring transmission time in accordance with the present invention. The mechanism 40 for measuring the state of each signal is composed of light emitting devices such as light emitting diodes of "Power" for indicating the on state or off state of the power supply, of "SD" and "RD" for indicating that the sent data signal and returned data signal, which are signals that are to be measured, have propagated, and of "Test" for indicating that the data collection system is under test.

The apparatus for measuring transmission time in accordance with the present invention shown in FIG. 9 is characterized in that consideration is taken into the fact that the two signals, that are to be measured (sent data signal SD and returned data signal RD), among the various signals can be visually discerned by utilizing light emitting devices such as light emitting diodes, and that light signals, emanating from areas indicating the signals that are to be measured, are taken out by means of optical coupling dependent on the light emitting devices, with the system kept operating.

The light emitting devices in the mechanism 40 for indicating the state of each signal, which are used for visual check, are currently light emitting diodes substantially without exception because of their long service lives and the trend toward compact devices. The light emitting diodes have the most remarkable advantage of high response speed, in addition to the merit of permitting visual check. The present invention pays special attention to this point, wherein lights, emitted when a light emitting device in the mechanism 40 for indicating the state of each signal flickers according to data propagating through a transmission path, are taken out as a light signal, and then converted into an electrical signal. Thus, data sampling is executed at high speed.

In FIG. 9, an apparatus for measuring transmission time 9 in accordance with the present invention includes two probes for use in sampling signals that are to be measured (sent data signal SD and returned data signal RD); that is, an SD probe 65 and RD probe 68 having trailing cables 66 and 69, respectively. The SD probe 65 includes an SD light receiver 64 for detecting the sent data signal SD as light and an indicator 51d (See FIG. 4) for indicating that the SD light receiver 64 has trapped the sent data signal. The RD probe 68 includes an RD light receiver 67 for detecting the returned data signal RD as light and an indicator 57d (See FIG. 2) for indicating that the RD light receiver 67 has trapped the returned data signal.

A tester puts the two probes at optimal positions on the measurement object indicators in the mechanism 40 for indicating the state of each signal, and carries out testing with the help of the indications of the indicators 51d and 57d. In carrying out the work of putting the probes on the measurement object indicators, an electrical coupling between the mechanism for indicating the state of each signal and the probes is not needed at all. The transmission time of a signal can therefore be measured readily and quickly without interrupting a continuity of the system operation. The results of measurement of the signals, which are to be measured, performed by the two probes are indicated by a count indicator 91 in the apparatus for measuring transmission time 9.

A signal indicator 91 in the apparatus for measuring transmission time 9 is composed of indicators for indicating the states of signals relevant to the sent data signal SD and returned data signal RD, and a display for displaying the time instant at which the bit strings of the two signals coincide with a pre-set bit string.

The indications provided by the indicators are output in the form of light signals, and can therefore be used for any purpose other than transmission time measurement.

FIG. 10 is a circuit block diagram showing the configuration of another exemplary embodiment of the present invention. Herein, the configuration of an apparatus for measuring transmission time is illustrated on the assumption that a standard time ticking signal is input from a global positioning system (hereinafter abbreviated to GPS) or the like to a signal detecting unit. For simpler explanation, only the major portion of the apparatus for measuring transmission time is shown.

In another embodiment shown in FIG. 10, only a light signal emanating from a signal indicator 11 for indicating the state of a sent data signal SD in a measurement object signal indicator in a measured system modulating/ demodulating device 10 (or a light signal emanating from a signal indicator 12 for indicating the state of a returned data signal SD) is detected by a signal detecting unit. The configuration of a sent data signal detecting unit 50a for receiving the sent data signal SD is identical to that of the sent data signal detecting unit shown in FIG. 4. The description of the configuration will be omitted.

In FIG. 10, a standard time ticking signal ST provided by a standard time ticking signal generating unit 85 for generating a ticking signal representing the standard time provided by the GPS or the like is input to a signal detecting unit 50c in the form of an electrical signal.

The signal detecting unit 50c comprises a timing generating circuit 59c, a shift register 60c, a pattern setting circuit 61c, and a comparator circuit 62c which have the same abilities as the corresponding component elements in the aforesaid sent data signal detecting unit 50a. However, the signal detecting unit 50c inputs a standard time ticking signal ST in the form of an electrical signal. This obviates the necessity of a light receiving circuit having a light receiving device such as a phototransistor or photodiode, a level converting circuit for converting a light signal sent from the light receiving circuit into an electrical signal, and the like. The circuitry of the signal detecting unit can thus be simplified.

Alternatively, a standard time ticking signal may be supplied from a GPS or the like in the form of light emissions. In this case, a light signal corresponding to the standard time ticking signal must be detected by a signal detecting unit having the same circuitry as the sent data signal detecting unit 50a. Nevertheless, there is a merit that the standard time ticking signal can be taken out without a need of electrical coupling.

In the foregoing another embodiment, an absolute reference signal such as a standard time ticking signal is input to a signal detecting unit in an apparatus for measuring transmission time. A delay relative to the absolute reference signal can then be measured with high precision. By adopting this kind of measuring method, the delay time occurring in a transmission path can be measured for each direction.

When the apparatus for measuring transmission time in accordance with this embodiment is used at two different points, delay time occurring during signal transmission between the two points can be measured. The duration of a ticking signal supplied from a GPS is said to be in the order of microseconds ($10^{-6}$sec.). Owing to the ticking signal, remarkably high accuracy expressed with a value of two or more digits is attained for the purpose of delay time measurement of the present invention.

It has become necessary for a maker concerned with a type I communication enterprise, such as NTT corporation, to measure the delay time occurring over a transmission line with a system kept running. At present, an appropriate apparatus for measuring transmission time is unavailable. An apparatus for measuring transmission time in accordance with the present invention is expected to be utilized effectively by a maker concerned with type I communications enterprises or the like.

As described so far, according to a typical preferred embodiment of the present invention, the employment of a signal indicating unit having light emitting devices or the like such as the one mounted on the front side of a modulating/demodulating device in a data collection system such as an earthquake observation system, makes it possible to take out signals that are to be measured or signals that are objects of transmission time measurement, in a state in which a data collection system is kept operating and the electrically uncoupled state relative to a transmission path is retained. Consequently, the transmission time of a signal can be measured readily and very accurately without interrupting a continuity of the system operation.

According to a preferred embodiment of the present invention, detection of a data sampling start command sent from a collection station or detection of a data return notice can be executed outside a system by utilizing the optical coupling with a mechanism for indicating the state of each signal. A sync signal conformable to a transmission mode set for a data collection system can therefore be produced readily and quickly using an instantaneous synchronization generating method. This enables execution of interlocked observation of other various kinds of general-purpose equipment.

According to a preferred embodiment of the present invention, dedicated facilities including a signal detecting facility and counting facility for an apparatus for measuring transmission time are integrated into one unit. Consequently, the whole measurement system including a measuring apparatus becomes as small as about $1/100$ of a known group of measuring instruments and as lightweight as about $1/500$ thereof. As a result, transmission time can be measured on the premises of a narrow and small observation station. Furthermore, since the apparatus for measuring transmission time is designed so that it can be segmented in relation to the dedicated facilities. This contributes to marked improvement in an operational efficiency of the measuring apparatus.

In practice, a preferred embodiment of an apparatus for measuring transmission time in accordance with the present invention was used to conduct measurement. Testing of as many as 100 observation stations, which used to be considered to require about five days, can be completed in 1.5 days.

According to a preferred embodiment of the present invention, a time ticking signal representing the standard time provided by a GPS or the like is inserted as an absolute reference signal into an apparatus for measuring transmission time. A delay relative to the reference signal can therefore be measured.

Consequently, the transmission time between two arbitrary points within a transmission line can be measured for each direction in a transmission path. Further, the transmission time of a signal can be calculated with higher accuracy than the case in which the transmission time is calculated by using two kinds of data signals that are to be measured.

I claim:

1. An apparatus for measuring transmission time that is utilized for a data collection system including an observation station situated in a given region, a collection station for collecting data from said observation station over a transmission line, and a signal indicating unit for indicating the states of arbitrary signals to be transmitted through a transmission path within said transmission line, and that is designed for measuring the transmission time necessary for said signal to propagate through said transmission path, comprising:

a signal detecting means for taking out, from said signal indicating unit, and detecting a first signal to be sent from said collection station to said observation station in order to start data collection, and a second signal to be returned from said observation station to said collection station in order to notify that said first signal has been received, in a state in which said data collection system is kept operating and the electrically uncoupled state relative to said transmission line is retained;

a transmission time calculating mean for calculating the transmission time of a signal propagating through said transmission path on the basis of a difference between the time instant at which said first and second signals are detected; and wherein said signal indicating unit includes light emitting devices for indicating said states of signals in said transmission path by means of lights, wherein said signal detecting means includes light receiving units for receiving light signals emanating from said light emitting devices and converting them into electrical signals, and comparing means for comparing patterns of electrical signals supplied from said light receiving units with a given pattern registered in advance and checking if both patterns coincide with each other, and when said both patterns coincide with each other, it is recognized that at least one of said first and second signals has been detected.

2. An apparatus according to claim 1, wherein the results of detection of said first and second signals performed by said signal detecting means are output in the form of electrical signals.

3. An apparatus according to claim 1, wherein the results of detection of said first and second signals performed by said signal detecting means are output in the form of light emissions from associated light emitting devices.

4. An apparatus according to claim 1, further comprising an instantaneous synchronization timing generating means for generating a timing signal, which is used to sample data sent from said observation station, on the basis of said first and second signals within a predetermined time interval.

5. An apparatus according to claim 2, further comprising an instantaneous synchronization timing generating means for generating a timing signal, which is used to sample data sent from said observation station, on the basis of said first and second signals within a predetermined time interval.

6. An apparatus according to claim 3, further comprising an instantaneous synchronization timing generating means for generating a timing signal, which is used to sample data sent from said observation station, on the basis of said first and second signals within a predetermined time interval.

7. An apparatus for measuring transmission time that is utilized for a data collection system including an observation station situated in a given region, a collection station for collecting data sent from said observation station over a transmission line, and a signal indicating unit for indicating the states of arbitrary signals to be transmitted through a transmission path within said transmission line, and that is designed for measuring the transmission time necessary for said signal to propagate through said transmission path, said apparatus for measuring transmission time comprising:

a signal detecting means for taking out, from said signal indicating unit, and detecting a specific signal relevant to data collection in a state in which said data collection system is kept operating and the electrically uncoupled state relative to said transmission path is retained, said signal detecting means inputting a reference signal that is different from said signal relevant to data collection, wherein said apparatus for measuring transmission time further comprises:

a transmission time calculating means or calculating the transmission time of a signal propagating through said transmission path on the basis of a difference between the time instant at which said specific signal is detected and the time instant at which said reference signal is detected; and wherein said signal indicating unit includes a light emitting device for indicating said state of a signal in said transmission path by means of lights, wherein said signal detecting means includes a light receiving unit for receiving a light signal emanating from said light emitting device and converting it into an electrical signal, and a comparing means for comparing the pattern of an electrical signal supplied from said light receiving unit with a given pattern registered in advance and checking if both the patterns coincide with each other, and when both the patterns coincide with each other, it is recognized that said specific signal relevant to data collection has been detected.

8. An apparatus according to claim 7, wherein said reference signal is input as an electrical signal to said signal detecting means.

9. An apparatus according to claim 7, wherein said reference signal is a light signal stemming from light emissions and said light signal is input to said signal detecting means.

10. An apparatus according to claim 7, further comprising an instantaneous synchronization timing generating means for generating a timing signal, which is used to sample data sent from said observation station, on the basis of said specific signal relevant to data collection and said reference signal within a predetermined time interval.

11. An apparatus according to claim 8, further comprising an instantaneous synchronization timing generating means for generating a timing signal, which is used to sample data sent from said observation station, on the basis of said specific signal relevant to data collection and said reference signal within a predetermined time interval.

12. An apparatus according to claim 9, further comprising an instantaneous synchronization timing generating means for generating a timing signal, which is used to sample data sent from said observation station, on the basis of said specific signal relevant to data collection and said reference signal within a predetermined time interval.

13. An apparatus for measuring transmission time that is utilized for a data collection system including an observation station situated in a given region, a collection station for collecting data from said observation station over a transmission line, and a signal indicating unit for indicating the states of arbitrary signals to be transmitted through a transmission path within said transmission line, and that is designed for measuring the transmission time necessary for said signal to propagate through said transmission path, comprising:

a signal detecting means for taking out, from said signal indicating unit, and detecting a first signal to be sent from said collection station to said observation station in order to start data collection, and a second signal to be returned from said observation station to said collection station in order to notify that said first signal has been received, in a state in which said data collection system is kept operating and the electrically uncoupled state relative to said transmission line is retained;

a transmission time calculating mean for calculating the transmission time of a signal propagating through said transmission path on the basis of a difference between the time instant at which said first and second signals are detected;

an instantaneous synchronization timing generating means for generating a timing signal, which is used to sample data sent from said observation station, on the basis of said first and second signals within a predetermined time interval; and wherein said signal indicating unit includes light emitting devices for indicating said states of signals in said transmission path by means of lights, wherein said signal detecting means includes light receiving units for receiving light signals emanating from said light emitting devices and converting them into electrical signals, and comparing means for comparing patterns of electrical signals supplied from said light receiving units with a given pattern registered in advance and checking if both patterns coincide with each other, and when said both patterns coincide with each other, it is recognized that at least one of said first and second signals has been detected.

14. An apparatus for measuring transmission time that is utilized for a data collection system including an observation station situated in a given region, a collection station for collecting data sent from said observation station over a transmission line, and a signal indicating unit for indicating the states of arbitrary signals to be transmitted through a transmission path within said transmission line, and that is designed for measuring the transmission time necessary for said signal to propagate through said transmission path, said apparatus for measuring transmission time comprising:

a signal detecting means for taking out, from said signal indicating unit, and detecting a specific signal relevant to data collection in a state in which said data collection system is kept operating and the electrically uncoupled state relative to said transmission path is retained, said signal detecting means inputting a reference signal that is different from said signal relevant to data collection;

a transmission time calculating means or calculating the transmission time of a signal propagating through said transmission path on the basis of a difference between the time instant at which said specific signal is detected and the time instant at which said reference signal is detected;

an instantaneous synchronization timing generating means for generating a timing signal, which is used to sample data sent from said observation station, on the basis of said specific signal relevant to data collection and said reference signal within a predetermined time interval, wherein said signal indicating unit includes a light emitting device for indicating said state of a signal in said transmission path by means of lights, wherein said signal detecting means includes a light receiving unit for receiving a light signal emanating from said light emitting device and converting it into an electrical signal, and a comparing means for comparing the pattern of an electrical signal supplied from said light receiving unit with a given pattern registered in advance and checking if both the patterns coincide with each other, and when both the patterns coincide with each other, it is recognized that said specific signal relevant to data collection has been detected.

* * * * *